Jan. 4, 1938. C. B. REDRUP 2,104,391
SWASH MECHANISM
Filed Dec. 12, 1936   8 Sheets-Sheet 1

Inventor:
Charles Benjamin Redrup,
By Stebbins, Blenko & Parmelee
attys.

Inventor:
Charles Benjamin Redrup,
By Stebbins, Blenko & Parmelee, Attys.

Patented Jan. 4, 1938

2,104,391

UNITED STATES PATENT OFFICE 2,104,391

SWASH MECHANISM

Charles Benjamin Redrup, Bristol, England, assignor to The Bristol Tramways & Carriage Company Limited, Bristol, England, a British Company Application December 12, 1936, Serial No. 115,593
In Great Britain December 21, 1935

13 Claims. (Cl. 74—60)

This invention is for improvements in or relating to swash-mechanism such as may be used for converting reciprocating motion into rotary motion, as in an internal-combustion engine, or rotary motion into reciprocating, as in a reciprocating pump.

Swash-mechanism comprises essentially three working parts:

(1) A crank-pin or other cylindrical member (herein termed the "crank") rotatable about an axis inclined at an oblique angle to its own;

(2) A swash-member borne on the crank, and (3) Means (herein termed the "stabilizer") for constraining the swash-member from rotating bodily with the crank.

It is known (see, for example, British patent specification No. 398,553) that it is possible so to constrain the swash-member that all points on it lying in the same plane normal to the crank-axis and at the same radius from the crank-axis will describe identically similar paths. The movement of a swash-member constrained in this way is herein termed "symmetrical" motion and the present invention is concerned solely with swash-mechanism in which the working swash-member is so constrained that it describes symmetrical motion although, as will appear hereinafter, the invention may make use of an auxiliary swash-member to constitute the stabilizer and such auxiliary swash-member, in general, is constrained so as not to describe symmetrical motion.

The object of the present invention is to enable the working swash-member to move symmetrically by constraining a stabilizer or a part of it to move in a plane.

Before the mechanical construction of a swash-mechanism according to the invention is described in detail, the geometry of the mechanism will be explained with reference to Figures 1, 2 and 3, of the accompanying drawings.

Figure 1:
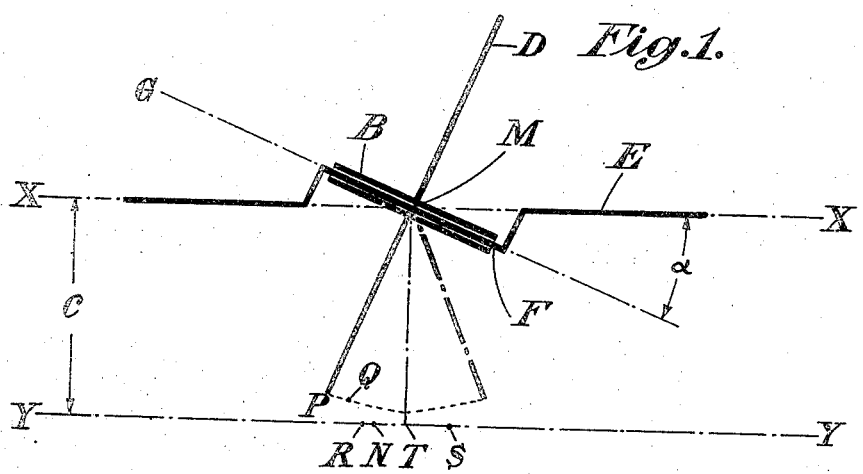
Figure 2:
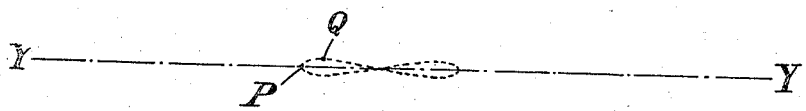

Figure 1 is a diagrammatic side elevation illustrating the essential components of a swash-mechanism except for the stabilizer. A swash-member D is carried by a bearing member B which is mounted on a crank F. The crank F is inclined at an angle $\alpha$ to the axis XX of a crank-shaft E. The swash-member D is assumed to be a circular disc for the sake of simplicity.

Let P be the lowest point on the periphery of the disc D when the axis GM of the crank F lies in a vertical plane as shown in Figure 1, M being the point where the plane of the disc D is pierced by the crank-shaft axis XX. If the crank-shaft E now begins to rotate about its own axis so that the axis GM of the crank F rises out of the plane of the paper, the point P will move to a new position Q but the path of movement of P will depend upon the nature of constraint imposed upon the swash-member. Let it be assumed that the swash-member D is constrained to describe symmetrical motion, as above defined, so that all points such as P describe identically similar paths. As is known, in these circumstances P will describe a lemniscate figure lying on the surface of a sphere having its centre at M. The form of the lemniscate is seen in plan in Figure 2, and in elevation in Figure 1.

Consider the plane GMP. As the shaft E rotates this plane will oscillate about M. If YY is a line arranged vertically below and at a distance $c$ from XX, the plane GMP will intersect this line in a point N and it is clear that there will be two extreme positions R and S of this point and a mean position T, which is vertically below M. The movement of N along the line YY will be referred to again below.

Figure 3:
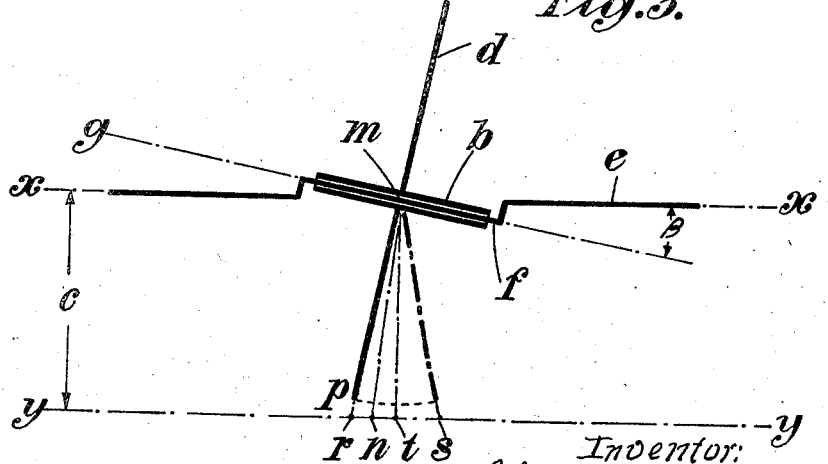

The diagram of Figure 3 shows another swash-mechanism and parts corresponding to the parts of Figure 1 are denoted by corresponding small letters. In Figure 3 the axis $gm$ of the crank $f$ is inclined to the crank-shaft axis $xx$ at an angle $\beta$. Whereas the swash-member D of Figure 1 moves symmetrically, the corresponding member $d$ of Figure 3 does not. Let it be assumed that the point $p$ on the periphery of $d$ is constrained so as to lie always in the vertical plane containing the crank-shaft axis $xx$; $p$ therefore describes a circular arc about $m$ as centre.

A line $yy$ is disposed a distance $c$ vertically below $xx$ like the line YY in Figure 1.

Consider the plane $gmp$. It is clear that since $mp$ always lies in the vertical plane contained by $xx$ and $yy$ the point of intersection of the plane $gmp$ with $yy$ will coincide with the point of intersection of $mp$ with $yy$. The line $mp$ intersects the line $yy$ in a point $n$ and it is clear that this point will move from one extreme $r$ to another $s$ about a mean position $t$ as the shaft $e$ rotates.

It can be proved by a mathematical analysis that provided the angle $\alpha$ is twice the angle $\beta$ and provided the cranks B and $b$ are in phase, the movement of the point N will be identical in all respects with the movement of the point $n$. This fact is made use of in the present invention although it is not always necessary to use a second swash-member as in Figure 3, because in certain cases the motion of the point $n$ can be simulated by other means.

It can further be demonstrated that the straight line MN of Figure 1 which is the line in which the plane GMP intersects the vertical plane containing XX and YY is identical at all times with the straight line mn of Figure 3. This shows that the line YY need not be parallel to the crank-shaft axis and need not be a straight line, and the identity between the motions of N and n will hold for any curve YY lying in the vertical plane containing the crank-shaft axis.

Moreover, it will be understood from considerations of the symmetry of the mechanism that the discussion above will apply to any plane containing the crank-shaft axis; a vertical plane was chosen merely for the purpose of illustration.

According to one feature of the present invention, swash-mechanism comprises, in combination, a swash-member borne upon a crank rotatable about a crank-shaft axis, a stabilizer having a part which is constrained always to move in a plane containing the crank-shaft axis, means for oscillating said part of said stabilizer about the point of intersection of the crank-axis and the crank-shaft axis with an amplitude equal to half the amplitude of oscillation of the swash-member about that point and means for restraining relative rotational movement between the swash-member and the said part of the stabilizer about the crank-shaft axis.

The stabilizer, as has been described with reference to Figure 3, may be a second swash-member mounted on a crank in phase with the crank of the main swash-member and inclined to the crank-shaft axis at an angle equal to half the angle of inclination of the crank of the main swash-member.

The form of connection between the swash-member and the stabilizer must be such as to allow relative movement of two kinds:—

(1) Relative movement in a direction parallel with the crank-shaft axis. The necessity for this can be seen by comparing Figures 1 and 3 from which it is clear that the movement of P from left to right is twice the movement of p.

(2) Relative rotation about the line MN. This is necessary because, as the crank-shaft rotates, the main swash-member oscillates about this line through a full angle $2\alpha$ and the stabilizer through a full angle of $2\beta$.

Where the stabilizer is constituted by a second swash-member as above described, the interconnection may take various different forms. In one form of the invention the connection aforesaid is constituted by a link pivoted to the swash-member about an axis lying at right-angles to the plane GMN aforesaid and pivoted to the stabilizer about mn. In an alternative arrangement the stabilizer comprises simply a radial arm which executes the motion discussed as that of mn above and the swash-member is pivotally mounted on this arm. The relative movement under (1) above is accommodated by a slotted guide surface in the swash-member by which it engages the arm so that the swash-member is not only free to rotate on the arm but also to move as a whole in the direction of its own plane. Such an arrangement will be seen to correspond identically with the geometry of Figures 1 and 3 above described.

In a further alternative arrangement the stabilizer, instead of being driven by a second crank, has the necessary motion imparted to it through the intermediary of the swash-member itself to which it is so connected that a point on it moves in a plane containing the crank-shaft axis with a velocity at any instant which is identical with the velocity which would be experienced by the corresponding point on an auxiliary swash-member borne upon a second crank having its axis inclined to the crank-shaft axis at an angle of inclination equal to half the angle of inclination of the axis of the crank of the main swash-member.

Various specific embodiments of the invention will now be described by way of example with reference to Figures 4 to 14 of the accompanying drawings, of which:—

Figure 4:
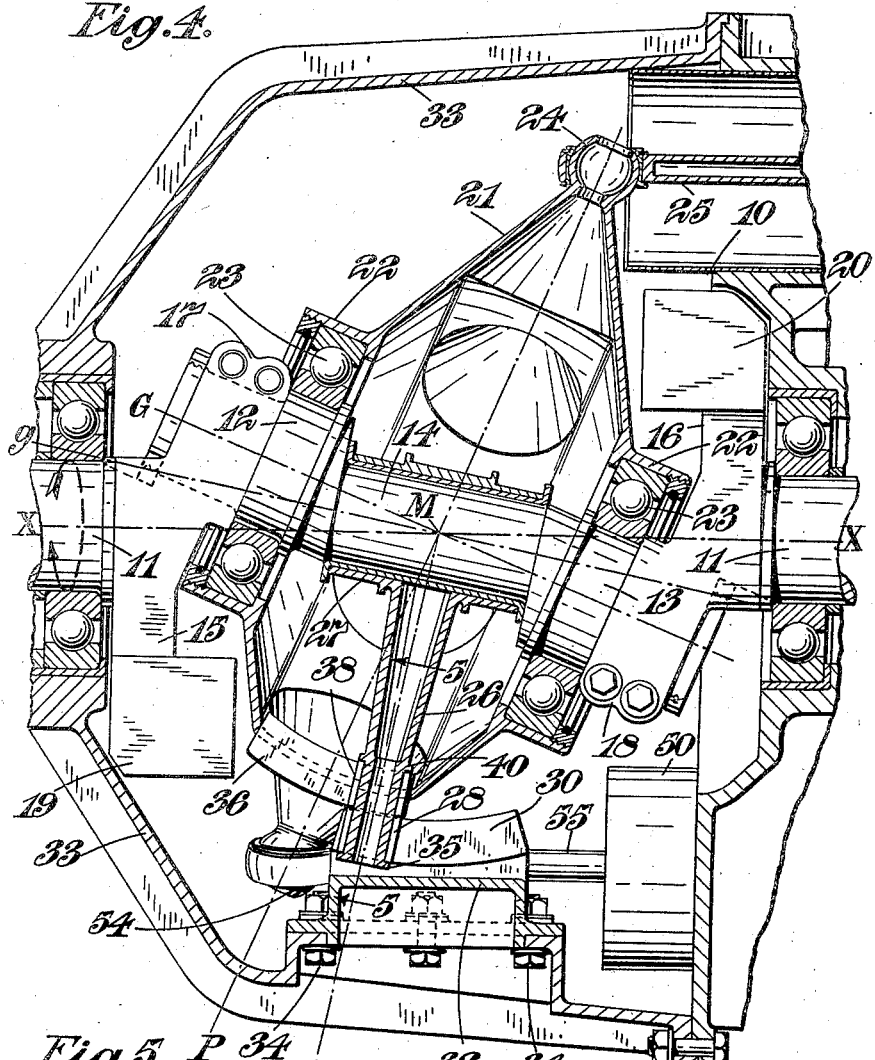
Figure 5:
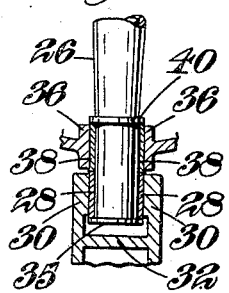
Figure 6:
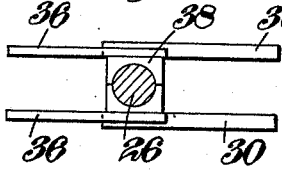
Figure 7:
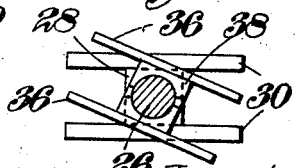
Figure 8:
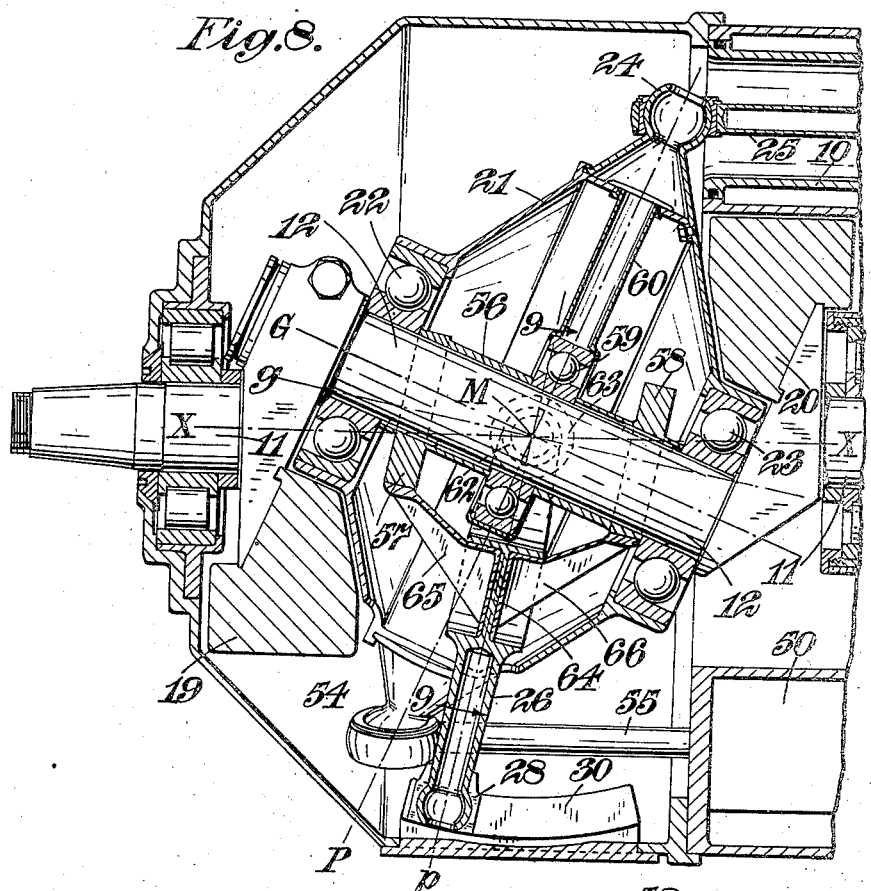
Figure 9:
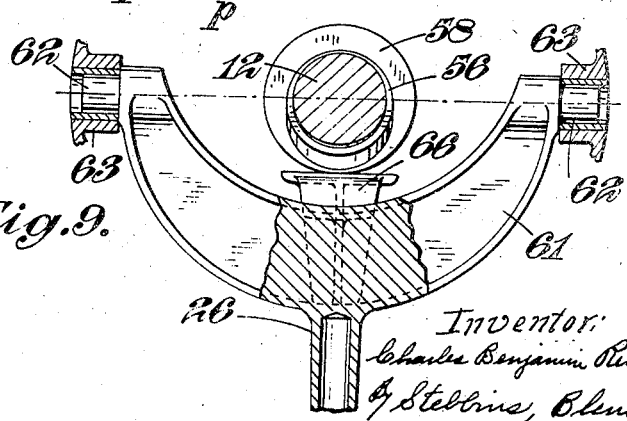
Figure 10:
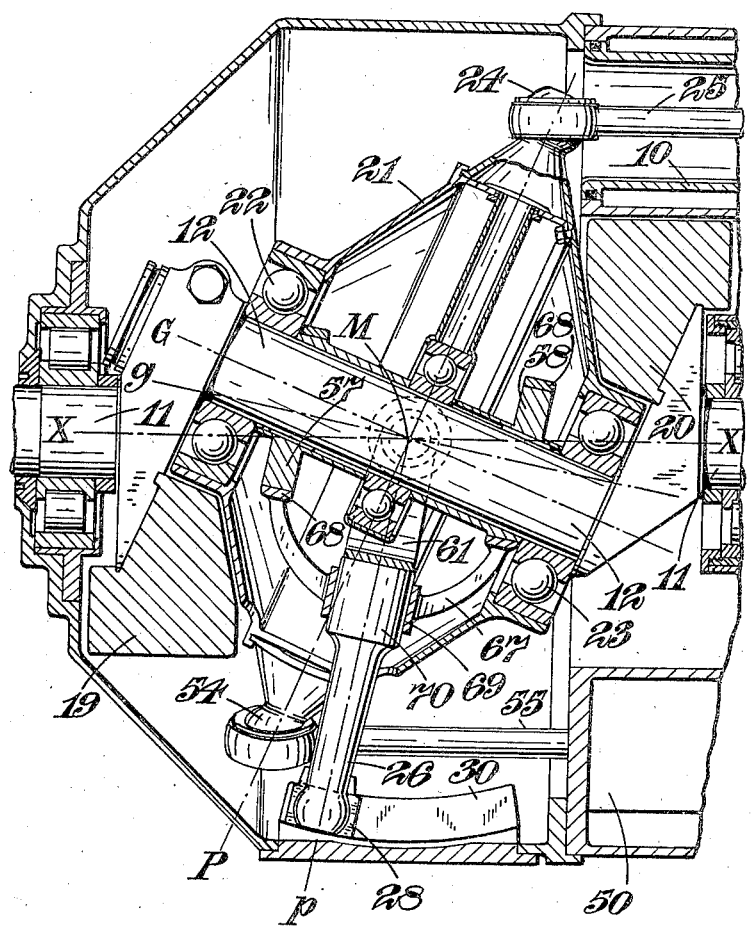
Figure 11:
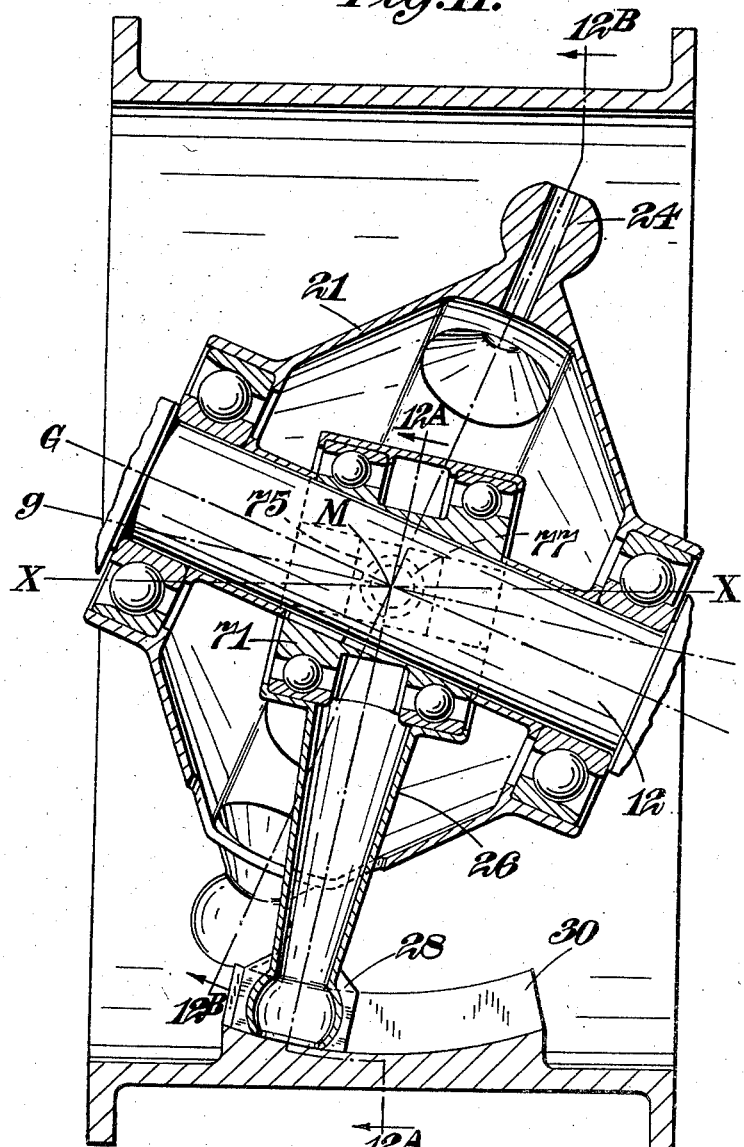
Figure 12:
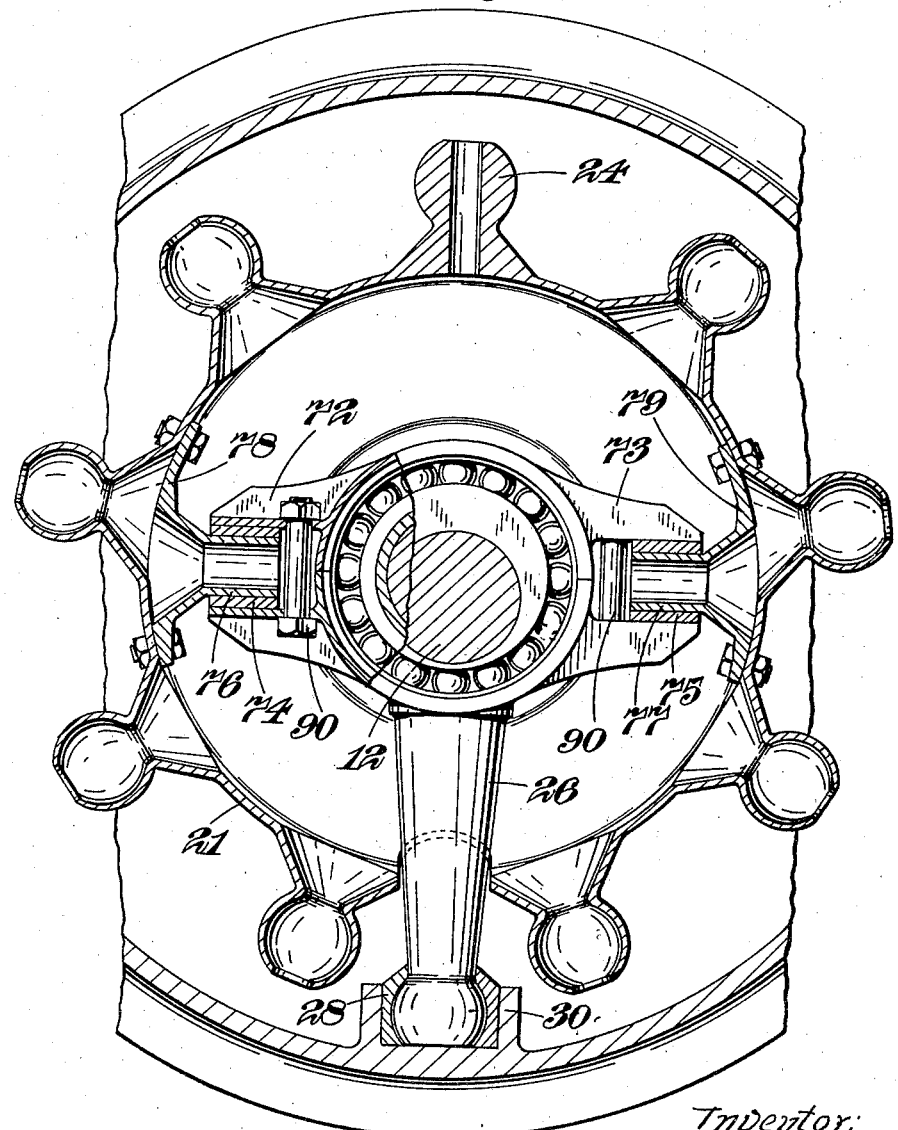
Figure 13:
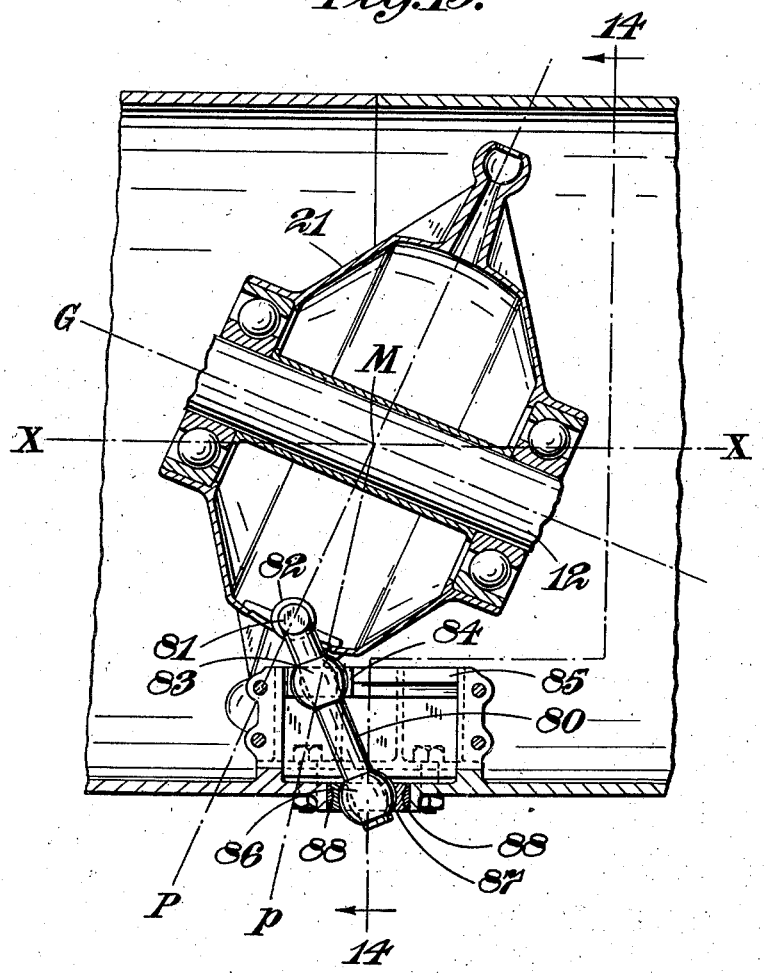
Figure 14:
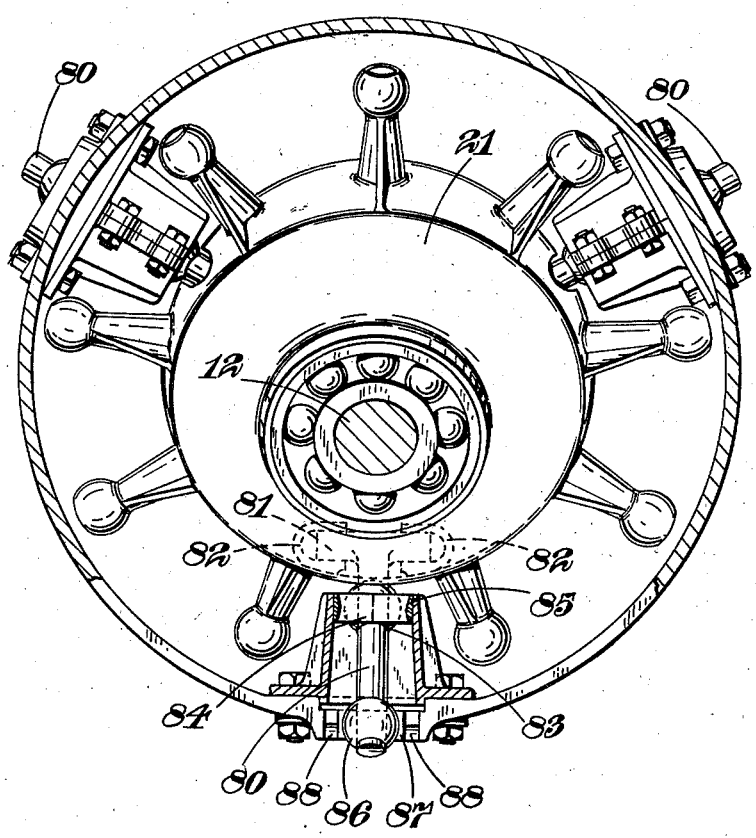

Figure 4 is a sectional elevation of the swash-member and associated parts of an internal-combustion engine, Figure 5 is a view of part of the stabilizer and its guides, being a section on the line 5—5 of Figure 4, Figures 6 and 7 are diagrammatic plan views of the guides of Figures 4 and 5, Figure 8 is a view similar to Figure 4 of an alternative form of the invention, Figure 9 is a section on the line 9—9 of Figure 8, Figure 10 shows a modification of the arrangement shown in Figure 8, Figure 11 is a sectional elevation of another alternative form of swash-mechanism according to the invention, Figure 12 is a section partly on the line 12A—12A and partly on the line 12B—12B of Figure 11, whilst Figures 13 and 14 are corresponding views of yet another alternative form of swash mechanism according to the invention, Figure 14 being a section on the line 14—14 of Figure 13.

In the internal-combustion engine shown in Figures 4, 5, 6 and 7, there is an odd number of cylinders 10, 50 etc., symmetrically arranged around a crank-shaft 11 the axis of which is indicated by the line XMX. The crank-shaft is formed with two cranks, one of which is composed of two parts 12, 13 having a common axis MG and the other of which 14, lying between the two parts 12, 13, has an axis Mg. The axis MG lies at an angle of $22\frac{1}{2}°$ to the crank-shaft axis XMX and the axis Mg of the crank 14 lies at an angle of $11\frac{1}{4}°$ to the crank-shaft axis, that is to say, at half the angle of the crank 12, 13. The cranks and crank-shaft are a fabricated structure of which the crank portions 12, 13, 14 are machined from one part which is affixed to the crank webs 15, 16 by clamping means 17, 18. The webs 15 and 16 are formed integrally with the shaft-portions 11 and may be provided with suitable balance-weights 19, 20.

Mounted on the main crank 12, 13 is a swash-member 21 having the approximate shape of a double cone. Its hub-portions 22 engage the crank-portions 12, 13 by ball-bearings 23 and the rim of the swash-member is formed with outwardly-projecting balls 24, 54 etc., each of which is engaged by the big-end of a connecting rod 25, 55 etc. It will be understood that the number of balls 24 is equal to the number of cylinders which is seven in the example illustrated. The ball 24 at the top of Figure 4 is in the position in which its centre lies in the vertical plane containing the crank-shaft axis and its connecting rod 25 is in the inner dead-centre position with respect to the cylinder 10. The ball 54 lies out of the vertical plane by an angle depending upon the number of cylinders and the connecting rod 55 is nearly at its outer dead-centre position with respect to its cylinder 50.

The stabilizer for the mechanism comprises a radially-extending pin 26 carried on a split sleeve 27 which is borne on the middle crank-portion 14. At its lower end the pin 26 carries rotatably upon it a square block 28 formed in two portions and slidable between vertical arcuate guide faces 30 (see also Figure 5). The guide faces are formed integrally with a plate 32 which is attached to the engine casing 33 by bolts 34. The engagement of the two parts of the square block 28 with the guide surfaces 30 prevents the block from moving at right-angles to the plane of Figure 4. The engagement of the block with the pin 26 prevents it from moving from left to right with respect to the pin and a flange 35 at the lower end of the pin prevents it from sliding downwardly off the pin.

The swash-member 21 has formed integrally with it two similar guide surfaces 36 between which there slides a square block 38 similar to the square block 28. This square block is also rotatably mounted on the pin 26 and is disposed between the block 28 and a flange 40 on the pin. It will be understood that lateral movement of the block 38 is prevented by its engagement with the guide surfaces 36 and by its engagement with the pin; upward movement along the pin is prevented by the flange 40 and downward movement by the engagement of the two blocks with one another. In this way also, the block 28 is prevented from sliding up the pin.

The guide surfaces 30 are spaced by equal distances either side of the vertical plane containing the crank-shaft axis. The centre line of the pin 26 is therefore constrained so as always to lie in this vertical plane. On the other hand, the guide surfaces 36 are spaced by equal distances one on either side of the plane containing the axis MG of the main crank and an imaginary point P on the swash-member being the point which is lowest when the parts are in the position shown in Figure 4. From the discussion given above with reference to Figures 1, 2 and 3, it will be seen that the plane GMP of Figure 4 will always intersect the axis of the fixed guides 30 in the same point as the centre-line of the stabilizer-pin 26. The diagram of Figure 6 shows in plan the disposition of the guides 36 and 30 corresponding to the disposition of the parts shown in Figure 4 and since the pin 26 is at the extreme limit of its movement to the left, the axes of the two guides coincide and the square blocks 38 and 28, therefore lie in register with one another. When the crank-shaft 11 has rotated through one right-angle in the direction of the arrow (Figure 4), the axis of the pin 26 will be a vertical line through M. The block 38 will lie half-way along the guide 36 and the block 28 half-way along the guide 30 so that the parts will assume the position shown diagrammatically in Figure 7.

It will be seen that the swash-member is restrained against relative rotational movement with respect to the stabilizer about the crank-shaft axis by the engagement of the guides 36 with the block 38. However, the swash-member moves from side to side (as seen in Figure 4) with twice the amplitude of movement of the stabilizer pin 26 and the difference between these two amplitudes is accommodated by the sliding of the guides 36 with respect to the block 38. In addition, the swash-member must rotate about the axis of the pin 26, as hereinbefore explained. Such rotation is made possible by the cylindrical bearing surface between the block 38 and the pin 26.

The purpose of the cylindrical bearing surface between the block 28 and the pin 26 is to accommodate the oscillatory rotation which the pin 26 describes about its own axis as the crank-shaft rotates.

In Figure 4, only a single stabilizer 26 is shown, but in an alternative arrangement (not shown in the drawings), the sleeve 27 could be formed with another similar pin extending upwardly in line with the pin 26. The additional pin would co-operate with guide surfaces similar to the guides 30 and 36.

In addition, other stabilizers similar to the pin 26 could be provided at convenient angles around the engine and such of these as have their axes in line could be rigidly connected together.

The form of constraint illustrated in Figure 4 causes the swash-member to describe symmetrical motion, for the reasons already given with reference to Figures 1 and 3, and the fact that the stabilizer 26 oscillates about the centre M with an amplitude equal to one half of the amplitude of oscillation of the main swash-member gives rise to an important advantage which will be discussed later.

In the alternative arrangement shown in Figures 8 and 9, the crank-shaft 11 carries a single crank 12 on which a swash-member 21 is borne as before, like references denoting like parts in Figures 4 and 8.

Between the bearings 22 and 23 the crank pin 12 has keyed to it a sleeve 56 which is formed integrally with two circular cams 57, 58. These cams have a common centre-line Mg which is inclined to the crank-shaft axis MX by an angle of 11¼° whereas the main crank 12 has its axis MG inclined to MX at an angle of 22½°. The cams 57 and 58 constitute the equivalent of a second crank and are the counterpart of the crank 14 of Figure 4.

Between the cams 57 and 58 there is a third ball-bearing 59 for the swash-member 21 which is supported upon it by means of a spider having tubular arms 60.

In this form of the invention the stabilizer 26, as seen in Figure 9, takes the form of a stirrup having curved arms 61 each of which is formed with a trunnion 62 engaging a bearing 63 on the swash-member 21. The axis of the trunnions 62 lies at right-angles to the main crank-axis MG and at right-angles to the axis of the stabilizer pin 26.

The pin 26 also carries a pair of tappets 65, 66, extending one on each side of the stirrup 61. Each tappet is formed at the top with a flat face which, with the parts shown in the position of Figure 8, lies in a plane at right-angles to the plane of the paper. The tappet 66 (see Figure 9) bears against the cam 58 and the tappet 65 against the cam 57.

The end of the pin 26 is spherical to engage a spherical bearing in a rectangular block 28 slidable between parallel vertical arcuate guides 30 as in Figure 4.

As the crank-shaft rotates, the cams 57, 58 oscillates the stabilizer 26 which, however, is constrained by the guides 30 so that its axis always lies in the vertical plane containing the crank-shaft axis. The swash-member 21 is restrained against rotating about the axis MX with respect to the stabilizer by the engagement of the trunnions 62 with the bearings 63. However, these trunnions permit the balls 24, 54, etc., to oscillate about M with an amplitude twice as great as the oscillation of the axis of the stabilizer pin 26. The necessary relative rotation between the swash-member 21 and the stabilizer about the axis of the stabilizer pin 26 is accommodated by the relative movement which occurs between each tappet 65, 66 and its corresponding cam 57, 58. That is to say, as the crank-shaft rotates, each tappet oscillates from side to side as seen in Figure 9 in addition to its up and down movement.

In this construction, also, the plane GMP intersects the vertical plane containing MX in the line of the axis of the stabilizer pin 26. The mathematical considerations discussed with reference to Figures 1 and 3 therefore apply to this case also and it will be clear that the swash-member 21 will therefore describe symmetrical motion.

Figure 10 shows a modification of the arrangement described with reference to Figures 8 and 9. In this modification, the stabilizer pin 26 is connected by arms 61 to trunnions engaging the swash-member 21 as in Figures 8 and 9. However, the connection between the pin 26 and the crank constituted by the two circular portions 57 and 58 is through the intermediary of a stirrup 67 which has bearing straps 68 to encircle the circular portions 57 and 58 and a bearing portion 69 engaging a journal 70 on the pin 26.

It will be seen that the arrangement of Figure 10 operates in exactly the same manner as that of Figures 8 and 9 with the exception that the relative movement of rotation between the swash-member and the stabilizer about the stabilizer pin axis is accommodated in the bearings 69, 70, the stirrup 67 being constrained to oscillate with the crank-portion 57, 58.

Yet another form of the invention is illustrated in Figures 11 and 12. In this construction a crank pin 12 is mounted on a crank-shaft (not shown) which rotates about its own axis MX. A ball-bearing 71 is carried by the crank pin 12 but is mounted on a different axis Mg from the axis MG of the main crank. The angle of inclination of MG to MX may be 22½° and that of Mg to MX is half this angle. The stabilizer pin 26 is carried by the outer race of the bearing 71 and its spherical end is engaged by a rectangular block 28 slidable in guides 30 similar to the guides 30 of Figure 8.

As can be seen in Figure 12 the stabilizer is T-shaped, the pin 26 constituting the leg of the T. The two arms 72, 73 extend laterally from the crank-axis Mg and afford the connection between the stabilizer and the swash-member. Each arm is forked, the two portions of each arm being held together by a bolt 90. Each fork constitutes a guide for a square block 74, 75 slidable in it. Each of the blocks 74, 75 has a cylindrical bore to receive a trunnion 76, 77 which is attached by a bracket 78, 79 to the swash-member 21. The axis of the trunnions 76, 77 lies at right-angles to the axis of the pin 26 and at right-angles to the crank pin axis MG.

It will be seen that the forked arms 72 and 73 by engagement with the trunnions 76, 77, restrain the swash-member against rotation about the axis MX with respect to the stabilizer pin. However, the necessary relative rotation between the swash-member and the stabilizer about the axis of the pin 26 is accommodated by the sliding movement of the blocks 74, 75 along their respective guides. The sliding blocks and guides are therefore the equivalent of the bearing 67, 70 of Figure 10.

In the modification illustrated in Figures 13 and 14, a swash-member 21 is borne on a crank 12 having its axis MG inclined at a suitable oblique angle to the crank-shaft axis MX. In this construction there is no second crank.

The stabilizer is constituted by a T-shaped rod 80 the arms 81 of which constitute trunnions which are received in bearings 82 carried by the swash-member 21. The trunnion axis lies at right-angles to the plane of the paper in Figure 13 and in the plane of the paper in Figure 14 when the parts are in the position shown, that is to say, when the crank pin axis MG lies in the vertical plane containing the crank-shaft axis.

The leg 80 of the stabilizer passes downwardly through a ball 83 which is mounted for universal movement in a block 84 which is slidable in guides 85, the axis of the guides 85 lying in the vertical plane containing the crank-shaft axis MX.

The lower end of the leg 80 passes through another ball 86 which is similarly mounted in a rectangular block 87 which is slidable in guides 88 the axis of which lies vertically below and at right-angles to that of the guides 85. Thus, in Figure 13, the ball 83 can move from side to side but its centre remains in the plane of the paper, whereas in Figure 14 the ball 86 can move from side to side but its centre remains in the plane of the paper.

Consider a radial line MP where P is the imaginary point on the periphery of the swash-member 21 which is the lowest of such points when the parts are in the position shown. This line will oscillate as seen in Figure 13 on either side of a mean position by an angle equal to the angle GMX. Consider also the line Mp which is the line passing through the centre of the ball 83. According to the invention the parts are so dimensioned that the amplitude of oscillation in the plane of Figure 13 of the line Mp is half the angle of oscillation of the line MP.

It will be seen that the plane containing the axis of the pin 80 and the line MP is the same as the plane GMP which has been discussed with reference to Figure 1. This plane intersects the vertical plane containing the crank-shaft axis MX in a line passing through M, and it will be clear that provided the centre of the ball 83 lies on this line the swash-member will be constrained so as to describe symmetrical movement.

Any number of stabilizers 80 may be arranged around the engine, for example, as shown in Figure 14, there may be three stabilizers in all, arranged at 120° to each other.

In all of the examples above described it will be seen that the symmetrical movement of the main swash-member is obtained by constraining a stabilizer in straight guides; this is an important simplification over known arrangements in which curved guides have been used, since it renders the parts less expensive to manufacture and removes the necessity for accurate adjustment in the direction of the guides.

However, the most important advantage which the present invention provides is the smallness of the movement described by the stabilizer. Where the stabilizer passes through an opening formed in the main swash-member this opening may be of smaller dimensions than in known arrangements and the swash-member may be made lighter in weight for a given strength.

In the examples of the invention illustrated in Figures 4 and 5, 8 and 9, Figure 10 and Figures 11 and 12 the auxiliary crank upon which the stabilizer is borne is arranged between the ends of the crank of the main swash-member; in some cases the main crank is formed in two portions between which the auxiliary crank is arranged. But in an alternative arrangement according to the invention the auxiliary crank may be arranged beyond the ends of the main crank so that the main swash-member lies within the stabilizer. In this case a part of the main swash-member will be extended radially outwardly for connection to the stabilizer.

The invention may be applied to any apparatus for which swash-mechanism is required.

I claim:—

1. Swash-mechanism comprising, in combination, a swash-member borne upon a crank rotatable about a crank-shaft axis, a stabilizer having a part which is constrained always to move in a plane containing the crank-shaft axis, means for oscillating said part of said stabilizer about the point of intersection of the crank-axis and the crank-shaft axis with an amplitude equal to half the amplitude of oscillation of the swash-member about that point and means for restraining relative rotational movement between the swash-member and said part of the stabilizer about the crank-shaft axis.

2. Swash-mechanism comprising, in combination, a main swash-member borne on a crank having its axis inclined at an oblique angle to the crank-shaft axis, a stabilizer constituted by a second swash-member borne on a crank having its axis inclined to the same crank-shaft axis at an angle equal to one half of the angle of inclination of the crank-axis of the main swash-member, the two crank axes lying in the same plane, means for constraining a point on the stabilizer always to lie in a plane containing the crank-shaft axis and means for constraining the main swash-member against rotation with respect to the stabilizer about the crank-shaft axis.

3. Swash-mechanism comprising, in combination, a main swash-member borne on a crank having its axis inclined at an oblique angle to the crank-shaft axis, a stabilizer constituted by a second swash-member borne on a crank having its axis inclined to the same crank-shaft axis at an angle equal to one half of the angle of inclination of the crank-axis of the main swash-member, the two crank axes lying in the same plane, means for constraining a point on the stabilizer always to lie in a plane containing the crank-shaft axis and means for constraining the main swash-member against rotation with respect to the stabilizer about the crank-shaft axis, wherein the second swash-member constituting the said stabilizer is so borne upon the second crank as to be capable of oscillating with respect to it about a plane normal to the crank-shaft axis.

4. Swash-mechanism comprising, in combination, a main swash-member borne on a crank having its axis inclined at an oblique angle to the crank-shaft axis, a stabilizer constituted by a second swash-member borne on a crank having its axis inclined to the same crank-shaft axis at an angle equal to one half of the angle of inclination of the crank-axis of the main swash-member, the two crank axes lying in the same plane, means for constraining a point on the stabilizer always to lie in a plane containing the crank-shaft axis and means for constraining the main swash-member against rotation with respect to the stabilizer about the crank-shaft axis, wherein the second swash-member makes contact with the second along a line so as to be capable of rotation with respect to the crank about a plane normal to the crank-shaft axis.

5. Swash-mechanism comprising, in combination, a main swash-member borne on a crank having its axis inclined at an oblique angle to the crank-shaft axis, a stabilizer constituted by a second swash-member borne on a crank having its axis inclined to the same crank-shaft axis at an angle equal to one half of the angle of inclination of the crank-axis of the main swash-member, the two crank-axes lying in the same plane, means for constraining a main swash-member against rotation with respect to the stabilizer about the crank-shaft axis and a radially-extending pin carried by the stabilizer and guided in a plane containing the crank-shaft axis.

6. Swash-mechanism according to claim 5, wherein the said means for constraining the main swash-member against rotation with respect to the stabilizer comprises a link pivoted to said pin about the pin-axis and pivoted to the main swash-member about an axis at right-angles to the plane containing both the axis of the said pin and the axis of the main crank.

7. Swash-mechanism according to claim 5, wherein the said means for constraining the main swash-member against rotation with respect to the stabilizer comprises a link pivoted to said pin about the pin-axis and pivoted to the main swash-member about an axis at right-angles to the plane containing both the axis of the said pin and the axis of the main crank, and wherein the two axes about which the link is pivoted intersect in a point lying on the axis of the crank-shaft.

8. Swash-mechanism according to claim 5, wherein the means for restraining the main swash-member against rotation with respect to the stabilizer is constituted by a trunnioned portion of said stabilizer having its trunnion axis at right angles to the pin-axis and wherein the trunnions are slidably mounted in guides carried by the main swash-member.

9. Swash-mechanism according to claim 2, wherein the said second swash-member carries a radially-projecting pin which engages on the one hand with a guide lying in a plane containing the crank-shaft axis, whereby the required constraint is imparted to the stabilizer, and on the other hand with a straight guide carried by the main swash-member and lying in a plane containing both the crank-axis of the main swash-member and a point on the periphery of the main swash-member.

10. Swash-mechanism according to claim 2, wherein the second swash-member constituting the stabilizer is mounted within the main swash-member and wherein the part or parts of the stabilizer which are constrained to lie in a plane containing the crank-shaft axis protrude through the main swash-member.

11. Swash-mechanism according to claim 2, wherein the main crank is formed in two co-axial portions and the second swash-member constituting the stabilizer is mounted within the main swash-member and wherein the part or parts of the stabilizer which are constrained to lie in a plane-containing the crank-shaft axis protrude through the main swash-member.

12. Swash-mechanism according to claim 1, wherein the said stabilizer has the required oscillation imparted to it solely by being directly interconnected with the swash-member.

13. Swash-mechanism according to claim 1, wherein the said stabilizer comprises a rod pivoted to the swash-member about an axis lying in a plane perpendicular to the crank-axis, and guided in a sliding member constrained to move in a plane containing the crank-shaft axis, wherein the guiding member lies at such distance from the crank-shaft axis and from the point of connection of the rod to the swash-member that its amplitude of oscillation is equal to half the amplitude of oscillation of the swash-member in the same direction.

CHARLES BENJAMIN REDRUP.